Figure 1:
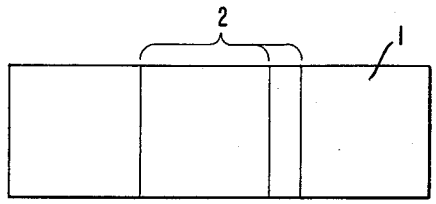

United States Patent Office 3,233,019
Patented Feb. 1, 1966

3,233,019
PROCESS OF MULTIPLE NECK DRAWING WHILE SIMULTANEOUSLY INFUSING MODIFYING AGENT
Dustin S. Adams, Wilmington, Del., assignor to E. I. du Pont de Nemours and Company, Wilmington, Del.
Filed Aug. 7, 1962, Ser. No. 215,385
8 Claims. (Cl. 264—78)

This application is a continuation-in-part of applicant's copending application Serial No. 757,370, filed August 26, 1958, now Patent No. 3,102,323.

This invention relates to the introduction of additives into filaments and films of synthetic organic polymers during multiple neck drawing.

In the final form in which they are sold to the ultimate user, most synthetic fibers and indeed many natural fibers contain modifying agents of one sort or another. The most usual single-modifying agent is a dyestuff. In addition to dyes, many other modifying agents are also used in enhancing the properties and appearance of synthetic fibers. Stabilizers are sometimes added to prevent or decrease deterioration of the polymer structure on exposure to light, ultraviolet radiation, or heat. Anti-yellowing agents have been employed. Resins, other polymers, cross-linking agents, and the like are also added to fibers or fabrics in order to promote wrinkle resistance, crease resistance, ease of laundering, and other physical properties.

Such modifying agents are normally applied to the oriented fibers or filaments. They can be added to the undrawn filaments under certain circumstances but, in most of these cases, reliance is placed upon the natural tendency of the modifying agent to diffuse into the interior structure of the polymer or to affix itself firmly on the surface of the fiber or filament. Such diffusing or adhering tendencies have been augmented in the past by pressure dyeing, by the use of dye carriers which are partial solvents or swelling agents for the polymer and by other processes which have in common that they depend upon a natural and mutual affinity between the modifier and the polymer itself.

There have been many classes of modifying agents which have not been successfully and permanently combined with the basic polymer structure because of a lack of affinity between the two substances. In some cases, the modifier does not penetrate at all but merely adheres to the surface and is in danger of being lost on repeated washings or wearings by abrasion or diffusion. This has imposed serious limitations upon the use of certain dyestuffs, particularly in the preparation of textiles from synthetic fibers. Also, while it has been possible to develop antistatic agents, wetting agents, light stabilizers, and the like for application to synthetic fibers, the permanence of such applications has not always been satisfactory.

It is an object of the present invention to provide fibers, films, and the like of synthetic organic polymers which contain higher concentrations of various additives and modifiers, and more uniformly distributed from the outside of the structure to the center than has heretofore been possible, including additives which cannot otherwise be combined with the polymer. A further object of this invention is to provide a process by which additives and modifiers can be infused into the interior of fibers, films, and the like so that the permanence of the additive is greater than is the case when such additives are merely surface coated onto the filament. A further object is to provide a process by which synthetic fibers and filaments and films can be more deeply and effectively dyed by a wide variety of dyestuffs, including those which are not substantive or possessing of any affinity for the polymeric structure itself or which lack diffusibility. A still further object is to provide a process by which synthetic organic fibers and filaments and films can be simultaneously oriented and have applied a modifier or additive in deep penetration into the interior structure of the polymeric material. Other objects will become apparent from the description of the invention and examples which follow.

These objects are achieved in highly and uniformly oriented structures, such as filaments, films and the like of substantially uniform diameter or thickness consisting essentially of synthetic organic polymeric material having a modifying agent distributed therein in deep penetration into the structure transversely to the axis of orientation, the said modifier being present in a multiplicity of short-length regions of non-uniform concentration along the said axis of orientation, the variations occurring with a frequency of at least about 10 per inch and preferably from 500 to 20,000 per inch.

Another object of this invention has been attained by the process of drawing a shaped article of a polymer selected from the class of condensation polymers and polyhydrocarbons by a multiple neck process while in contact with a cracking agent and a modifying agent whereby the modifying agent is infused and entrapped within the shaped article to such a degree that significant amounts are not removed from the article upon exposure to air or water.

A further object has been attained by a step subsequent to the above process whereby the modifying agent is altered so as to enhance its permanence within the fiber structure.

By the expression "modifying agent" is meant any substance soluble in the cracking agent which is not substantially removed from the polymer upon subsequent exposure to water or air, or which can enter into a chemical reaction so that the reaction product of the original modifying agent is rendered permanently stable to removal upon exposure of air or water. Such subsequent reactions are well known and include polymerization of monomers, the formation of water insoluble salts from water soluble compounds and the like.

By the expression "cracking agent" is meant any liquid which will cause cracks to form on the surface of the fiber or film when tension is applied. The cracks form in a plane normal to the axis of tension. For fibers, tension is normally applied to the fiber axis and the cracks are transverse to this axis. If a torsional stress is applied to a fiber, the cracks form helices whose axes correspond to the fiber axis.

In the drawing, FIGURES 1 to 4 illustrate on a greatly magnified scale the changes which occur in various stages of drawing fibers by a multiple neck process. FIGURE 1 is a side view of a representative fiber portion 1 which has been drawn in a cracking agent until transverse cracks 2 form around the fiber.

Figure 2:
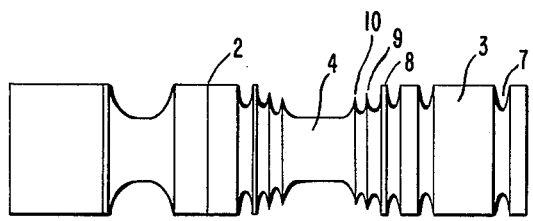

FIGURE 2 is a corresponding side view after the fiber has been drawn a further amount in a cracking agent. Some regions 4 have necked down to their final drawn diameter while other regions 3 have not been altered. Some transverse cracks have opened, resulting in partially necked down portions 7, and new cracks 2 have appeared of the type shown in FIGURE 1. Some unaltered segments 8 remain which are quite narrow and would, after further drawing, become still narrower by virtue of further crack development. More advanced stages, in the progression from unaltered fiber regions 3 to highly drawn fiber regions 4, are shown by extremely narrow segments 9 and 10, where no peripheral band of original surface remains and no further cracking can occur. Such minute segments will decrease in diameter, as illustrated by segment 10, until they eventually have the diameter of the completely drawn region 4.

Figure 3:
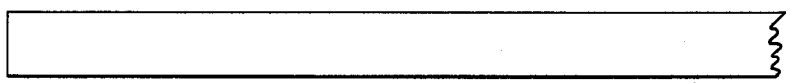

FIGURE 3 is a corresponding side view of the substantially smooth fiber which results after completion of drawing.

Figure 4:
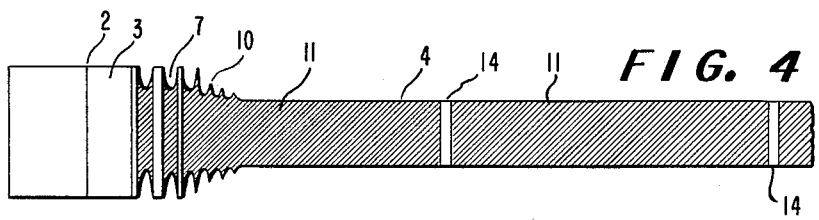

FIGURE 4 is a side view illustrating the appearance of a partially drawn filament when the cracking agent contains a modifying agent such as a dye, portions 11 which have absorbed the agent being indicated by the hatched zones. The undrawn regions 3 contain no dye. Drawn regions 4 are infused with dye and cracking agent in discontinuous portions 11 separated by undyed sections 14.

Figure 5:
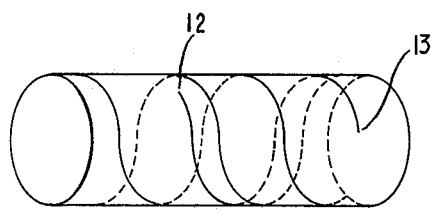

FIGURE 5 is a side view of a portion of partially drawn fiber which has been subjected to both torsional and axial stress during drawing in the presence of the cracking agent. In this case, unlike the fiber of FIGURE 1, the ends 12 and 13 of a propagating crack do not meet since cracks follow helical paths in opposite directions. Further stress and strain in torsion and along the axis will cause formation of additional helical cracks and will also draw the fiber at the base of the cracks. Imbibition of modifier added to the cracking agent will also occur.

The following chemical criteria may be used for selection of cracking agents with polyester fibers. (1) The agent should be unsaturated or contain other sources of extremely labile electrons. (2) The agent should be liquid at the cracking temperature employed in the process to prevent crystallization of the agent in the fiber. (3) The agent should not be strongly self associating (e.g., that displayed by difunctional alcohols or amines) since this reduces possibilities for association with polymer which is postulated to be necessary.

In general, liquid cracking agents for use in this invention may be pure compounds or solutions. No complete list of cracking agents can be given which are operable for all polymers. A simple test may be done by drawing a freshly spun undrawn fiber under the surface of the liquid to be tested a small amount (about 1.5×). By freshly spun is meant a fiber that is less than one week old. This is for purposes of the test only. The process of this invention can be used on aged fibers. Microscopic examination will show transverse cracks and/or multiple neck drawing as shown in the figures if the liquid is a suitable cracking agent. Since multiple-neck drawing is a prerequisite for infusing the modifying agent in accordance with this invention, this preliminary test can be conducted without modifying agent present.

Results of such tests of cracking agents are illustrated in Table I. In each instance, a 34-filament yarn (240 total denier) of polyethylene terephthalate that has not been drawn and is essentially unoriented is placed under the surface of various liquids and drawn about 2×. Results based on behavior during drawing and subsequent microscopic examination of the yarn are given in the table. It will be observed that raising the temperature from 20° to 50° C. made ethanol and ethylene glycol ineffective. Excessive dilution with an inert liquid likewise lowers the cracking ability of the agents until they become ineffective. Thus, an active agent such as ethanol will be made ineffective at 20° C. by the addition of sufficient water (to give a 10% solution).

TABLE I

| Item | Drawing Medium | Temp., °C. | Type of Drawing | |
|---|---|---|---|---|
| | | | Single Neck | Multiple Neck |
| 1 | Purified kerosene | −10 | | + |
| 2 | ----do---- | 0 | | + |
| 3 | ----do---- | 13 | | + |
| 4 | Water | 0 | + | |
| 5 | ----do---- | 13 | + | |
| 6 | ----do---- | 50 | + | |
| 7 | ----do---- | 90 | + | |
| 8 | Ethanol (100%) | 20 | | + |
| 9 | ----do---- | 50 | + | |
| 10 | Diethylene glycol | 20 | | + |
| 11 | ----do---- | 50 | + | |
| 12 | Glycerol | 20 | + | |

The liquid chosen should not, in general, be a solvent or strong swelling agent for the polymer. Solvent action by a liquid necessarily eliminates the formation of surface cracks. Certain liquids which have some solvent or swelling tendency on the polymer can be employed if they are otherwise suitable, provided that the contact time between the liquid and the polymer is kept short; that is, the crack drawing must be completed before the swelling or plasticizing action has a chance to occur, since such action would prevent the formation of fissures or cracks. Some compounds which are too active in the pure state and cause breaks, such as dimethylformamide, pyridine, acetone and dioxane, can be made useful agents for polyesters by dilution with water or less active agents such as kerosene.

The extent of cracking which occurs during drawing will vary with the cracking agent used, ranging from a few to as many as 20,000 cracks per inch. Since the fibers imbibe the dye, or other modifying agent added to the drawing liquid, only at regions that are drawn from cracks, the choice of cracking agent enables one to control the frequency of modified regions in the drawn fiber. A mixture of liquids can be employed as the cracking agent, as when a single liquid does not provide the desired frequency of cracking. Such a mixture of liquids should preferably form a single liquid phase. The dye or other additive may be solid or liquid, but should be soluble in the cracking agent.

Drawing must take place while the filaments are wet with the cracking agent containing the dye or other modifying agent in solution.

The cracking agent must be at a temperature of −30° to about 40° C., with 10° to 30° C. being preferred in order for this process to be operable. Other process variables such as drawing speed, denier per filament, fiber cross-section, the use of snubbing surfaces, etc., in a practical range are not critical. It is characteristic of multiple-neck drawing that the drawing force is lower than that required for conventional (single neck) cold drawing under the same conditions of temperature and speed (the reduction may be 90% or more).

Suitable cracking agents for polyesters include dimethoxy ethane, propargyl alcohol, N-vinyl pyrrodidone, homologous alkyl benzenes, alcohols, acids, esters, ketones, and olefinic compounds. Especially useful as aqueous solutions are pyridine, 2-methyl pyridine, dimethylpyridine, 4-methyl pyridine, 3-methyl pyridine, 2,4-dimethylpyridine, and benzyl amine, with the activity of the agents increasing in the order given.

Because of their commercial availability, ease of processing and excellent properties, the condensation polymers and copolymers, e.g., polyamides, polysulfonamides and polyesters, and particularly those that can be readily melt spun, are preferred for application in this method. Suitable polymers can be found, for instance, among the fiber-forming polyamides and polyesters which are described, e.g., in U.S. Patents 2,071,250, 2,071,253, 2,130,523, 2,130,948, 2,190,770, 2,465,319 and 2,658,055. Polyamides may contain the repeating unit

—X—Z—Y—Z— where —X— and —Y— represent divalent aliphatic or cycloaliphatic groups and —Z— represents the

linkage as in polyhexamethylene adipamide, polycaproamide, and polypiperazine adipamide. The group —Y— may be replaced with a divalent aromatic radical (—A—) as in polyhexamethylene terephthalamide. Additionally, polyamides having repeating units such as

—A—Z—B—Z— and —X—Z—B—Z— wherein —B— is divalent alkaryl (such as xylylene) may be used.

In a preferred embodiment of the invention, the fiber-forming polymer is a synthetic linear condensation polyester of bifunctional ester-forming compounds wherein at least about 75% of the repeating structural units of the polymer chain include at least one divalent carbocyclic ring containing at least six carbon atoms present as an integral part of the polymer chain and having a minimum of four carbon atoms between the points of attachment of the ring in the polymer chain (para-relationship in the case of a single 6-membered ring). The polyesters may be derived from any suitable combination of bifunctional ester-forming compounds. Such compounds include hydroxy acids such as 4-(2-hydroxy-ethyl)benzoic acid and 4-(2-hydroxyethoxy)benzoic acid, or mixtures of the various suitable bifunctional acids or derivatives thereof and the various suitable dihydroxy compounds and derivatives thereof. The repeating structural units of the polymer chain comprise recurring divalent ester radicals separated by predominantly carbon atom chains comprising hydrocarbon radicals, halogen-substituted hydrocarbon radicals, and chalcogen-containing hydrocarbon radicals wherein each chalcogen atom is bonded to carbon or a different chalcogen atom, and no carbon is bonded to more than one chalcogen atom. Thus, the repeating units may contain ether, sulfonyl, sulfide, or carbonyl radicals. Sulfonate salt substituents may also be present in minor amount, up to about 5 mol percent total sulfonate salt substituents in the polyester based on the number of ester linkages present in the polyester. Other suitable substituents may also be present.

Among the various suitable dicarboxylic acids are terephthalic acid, bromoterephthalic acid, 4,4'-sulfonyldibenzoic acid, 4,4'-diphenic acid, 4,4'-benzophenonedicarboxylic acid, 1,2-bis(4-carboxyphenyl)ethane; 1,2-bis(p-carboxyphenoxy)ethane, bis-4-carboxyphenyl ether and various of the naphthalenedicarboxylic acids, especially the 1,4-, 1,5-, 2,6-, and 2,7-isomers. Isophthalic acid is also suitable, especially when used in combination with a 1,4-dihydroxy-aromatic compound. Carbonic acid is similarly suitable.

Among the various suitable dihydroxy compounds are the glycols, such as ethylene glycol and other glycols taken from the series HO(CH$_2$)$_n$OH, where $n$ is 2 to 10; cis- or trans-p-hexahydroxylylene glycol; diethylene glycol; quinitol; neopentylene glycol; 1,4-bis(hydroxyethyl)-benzene; and 1,4-bis(hydroxyethoxy)benzene. Other suitable compounds include dihydroxyaromatic compounds such as 2,2-bis(4-hydroxy-3,5-dichlorophenyl)propane, hydroquinone, and 2,5- or 2,6-dihydroxynaphthalene.

In the following examples, which illustrate embodiments of the invention, percentages are by weight and dyes are identified by Color Index number (abbreviated "C.I."):

*Example 1*

A 34-filament as-spun yarn (240 total denier) of polyethylene terephthalate is hand drawn about 3.55× under the surface of a bath containing 1% of the basic green dye C.I. 42,000, 25% water and 74% ethanol at different temperatures. Samples are also merely stressed at about 0.3 gram/denier and then examined under a microscope. The results of visual observation by naked eye and by microscope are given in Table II.

TABLE II

| Draw Bath Temperature, °C. | Color of Drawn Fiber | Appearance of Stressed Sample |
|---|---|---|
| −28 | Medium green | Deeply dyed in cracked zones. |
| +20 | Deep green | Do. |
| +30 | do | Do. |
| +40 | Medium green | Do. |
| 50 | Colorless | No cracked zones. |

This shows that the transverse cracks are necessary for the imbibition of the modifying agent.

*Example 2*

A monofilament of undrawn polyethylene terephthalate of 1800 denier was immersed at room temperature in ethanol containing approximately 2% of a basic blue dye C.I. 42,595. The monofilament was drawn 6× by hand, while wet with the dye bath, and an intense blue color developed in the monofilament. A portion of the monofilament was cross-sectioned, and it was observed that the penetration of the dye was very deep. This deep penetration into a very heavy filament was unusual and unexpected. The dye was found to be fast to washing. Drawn filaments dyed with this dye by conventional means are not washfast. The blue color was very much darker than a control filament which was drawn by conventional process and then immersed in an equivalent solution of the basic dye in ethanol. This latter filament was practically colorless after washing.

*Example 3*

A cracking and drawing dye bath is prepared by mixing 80 parts of ethanol and 20 parts of water by weight with 1% of a basic green dye, C.I. 42,000. A sample of undrawn polyethylene terephthalate yarn containing 34 filaments is machine drawn through this dye bath at 15° C. to maximum draw ratio to give a drawn yarn of 70 denier. The feed rolls are operated at 9 yards per minute peripheral speed. This particular dye has little or no dyeability on undrawn or conventionally drawn polyethylene terephthalate yarns. However, in the present example a deep rich green color is obtained. Under the microscope, it is seen that the coloration is present in discontinuous sections along the filaments. The dyed sections alternate with undyed sections with an average frequency of about 500 per inch.

*Example 4*

A sample of the same multifilament yarn employed in Example 3 is machine drawn through a bath at 18° C. of 100% ethanol containing 1% of a basic green dye, C.I. 42,000. This process is run at a higher speed than before, the draw rolls operating at a peripheral speed of 327 yards per minute. The dye depth obtained is equivalent to that obtained in Example 3. The frequency of fluctuations is too great to be resolved with an optical microscope.

The example is repeated employing a dye bath at 18° C. containing 25% ethanol and 75% water with the same concentration of dye as before. In this second bath, cracking proceeds as before, and the fibers draw to the same deep green color. Microscopic examination shows longer fluctuations, about 60 per inch.

When a third bath was tried, containing 5% ethanol and 95% water, with 1% of the basic dye, also at 18° C., it was found that adequate cracking did not develop, dye depth was very light, and the process of this invention could not be performed in a satisfactory manner. The imbibed segments were separately visible to the naked eye, spaced at intervals from ½ inch to 2 inches.

*Example 5*

A 5% solution of acrylic acid in ethanol is employed as a cracking bath at room temperature. Undrawn polyethylene terephthalate ribbon is drawn through the bath. The solution causes cracking, and the ribbon is drawn to a uniform denier which is highly oriented. Following the drawing process, the ribbon is after-dyed by normal procedures using a basic green dye, C.I. 42,000, and a deep color results. The acrylic acid is imbibed and acts as a dye fixer for the fiber.

In a similar manner the following modifying agents, which can act as dye sites and dye carriers, are imbibed into the above fibers from a 20° C. ethanol bath: sodium-3-carbomethoxy benzene sulfonate, diphenoxy ethane, sodium salt of 1-naphthylamine-4-sulfonic acid, "Bisphenol A" [a phenolic compound, 2,2'-bis(4-hydroxy phenyl) propane made by Dow Chemical Company of Midland, Michigan], polyethylene glycol (molecular weight 400 and 750) and polyepichlorhydrins of molecular weight 1150 and 450, respectively. These are imbibed in amounts of about 3% to 8% by the above process.

*Example 6*

This example shows the insolubilization of a modifying agent within a fiber by a chemical reaction through use of high energy ionizing radiation. Such reactions are discussed in Belgian Patent No. 546,815, granted October 6, 1956, to E. I. du Pont de Nemours and Company (Magat and Tanner).

A yarn of 34 filaments of as-spun (undrawn) polyethylene terephthalate (7 denier per filament) is passed from a feed roll around a 6" diameter glass roll immersed in a bath at 20° C. containing a modifying agent, sodium styrene sulfonate (10%) in ethanol (30%) and water (60%) and then to a draw roll and on to a bobbin at 325 yards per minute. The bobbin is then rotated in the 2 m.e.v. electron beam of a Van de Graaff generator using a radiation dosage of 3.1 Mrad. (A Mrad is the amount of radiation equivalent to an energy absorption of 107 ergs per gram of irradiated material.) The final yarn contains 2.1% of sodium styrene sulfonate chemically bound within the fiber.

The above procedure is modified by exposing the yarn at a point between the cracking bath and the draw rolls to the electron beam. Under these conditions a radiation dosage of only 0.55 Mrad is needed to chemically combine 4.4% of the sodium styrene sulfonate to the fiber. The final fiber has excellent physical properties, low static propensity, good dyeability with basic dyes and high wickability.

*Example 7*

A 34-filament polyethylene terephthalate yarn (240 total denier) containing 0.3% $TiO_2$ is forwarded by a feed roll (25 y.p.m.) through a drawing bath of 100% ethanol at 20° C. containing 4 grams/liter of the dye C.I. 45,215 (Rhodamine 3G0) to a draw roll (37.5 y.p.m.) to afford a 1.5× draw. The yarn is colored a deep red. The yarn is washed, dried and the dye in the fiber determined colorimetrically on a pyridine extract of the dyed fiber. The fiber contains 0.35% dye.

When the alcohol dye bath was replaced with a solution of the same dye in water, no coloring of the fiber occurred.

Use of a 10% solution of pyridine in water at the same dye level under the above condition yields a fiber containing 0.32% of the dye.

The tension on the yarn just prior to the draw roll is 75 grams, 85 grams and 114 grams for the ethanol, pyridine and water baths, respectively.

Similar results are obtained when the polyethylene terephthalate in the above example is replaced with filaments made of any of the following polymers (wherein numbers indicate mol ratios of monomer units):

poly(ethylene terephthalate/isophthalate) (90/10),
poly(ethylene terephthalate/hexahydroterephthalate) (90/10 and 80/20),
poly[ethylene terephthalate/5-(sodium sulfo)isophthalate] (98/2 and 96.5/3.5),
poly(ethylene 2,6-naphthalene dicarboxylate),
poly[ethylene 2,6-naphthalene dicarboxylate/5-(sodium sulfo)isophthalate] (97/3).

The ethanol or aqueous pyridine can be replaced in the above examples (with any of the above polymers) by the following cracking baths:

100% tertiary butyl alcohol, 20% aqueous dimethoxyethane, 30% aqueous dioxane, 20% aqueous cyclohexanone and a solution of toluene (5%) in kerosene.

*Example 8*

In this experiment, successive imbibition was practiced in the following manner. Two different baths were made up, the first contains nickel chloride in ethanol and the second contains sodium borohydride in a 50–50 mixture of ethanol and water. The undrawn polyethylene terephthalate yarn is immersed in the nickel chloride bath and partially crack-drawn to cause nickel chloride to be imbibed into the interior of the yarn. The yarn is not drawn to completion but is removed from the first bath and the surface is rinsed free of nickel chloride solution. The yarn is then immersed in the sodium borohydride bath and crack-drawing is completed. The fiber is turned black to dark gray during the process. The dark color is intermittent along the threadline and is due to intermittent segments of reduced nickel; this is confirmed by electron micrograph studies which show sections of clear filament alternating with sections in which metallic nickel is present. The frequency of alternation is about 1000 per inch.

*Example 9*

Four cracking baths are made with the following composition: Each bath contains 50% by weight of ethanol and 50% by weight of water. In addition, the first bath contains 1% by weight of a yellow basic dye C.I. 41,000; the second bath contains 1% by weight of C.I. Basic Red 14; the third bath contains 1% by weight of a blue basic dye, C.I. 42,595; and the fourth bath contains no dyestuff. The undrawn polyethylene terephthalate yarn is immersed first in the yellow bath and partially drawn to imbibe the yellow dye in some sections of the yarn. The fiber is then removed, dried and the residual dye bath is washed off. The fiber is then immersed in the red dye bath and partially drawn somewhat further. The same process is continued in the other two remaining baths, with the yarn being drawn to completion in the final clear ethanol-water bath. In each dye bath, during the cracking and drawing process, the fiber imbibes the dyestuff, with which it is in contact, in various sections along the threadline. The sections which have cracked and imbibed one of the dyes are randomly distributed. The result is a multi-color dyed highly-drawn filament of polyethylene terephthalate, approximately 70 denier, 34 filaments, which has randomly distributed segments dyed yellow, red, blue, or not dyed at all. Since only approximate control is exerted to give uniform imbibition of the three dyes, the resulting yarn has a dark brown appearance to the naked eye. However, when viewed under a microscope at 50× magnification it is quite easy to distinguish the separate portions of the filament which have been dyed with the individual colors. The distribution is random within each filament as well as within the total filament bundle.

*Example 10*

A sample of undrawn 66-nylon yarn is placed in a cracking bath consisting of 100% acetone at 20° C., containing 2% of a basic green dye, C.I. 42,000. The yarn is drawn to give a highly oriented, 70 denier, 34 filament yarn which contains a high concentration of the green dye, giving a brilliant color.

When a sample of the undrawn nylon yarn was placed in the same bath without drawing, it picked up substantially no dye. Yarn which had already been drawn by conventional means before being immersed in the cracking bath remained substantially colorless.

Microscopic examination of a nylon which has been merely stressed in the above bath shows the presence of the transverse cracks required for the overall process, but the final, drawn yarns are substantially smooth.

It is noted that the above process is only effective below 40° C.

The following additional cracking agents are also suitable for similar processing of 66-nylon:

dimethylformamide, dimethylsulfoxide, ethylene chloride, methyl ethyl ketone, methyl isobutyl ketone, and dimethylacetamide. With all of the above cracking agents, absorption of dyestuffs, ultraviolet stabilizers, dye site additives, cross-linking agents such as formaldehyde and the like is satisfactory. The following liquids are not suitable for use in the process when treating 66-nylon: purified kerosene, silicone oil, acrylonitrile, carbon tetrachloride, and cyclohexane. Tetrahydrofuran is suitable if care is taken to avoid prolonged contact of the undrawn nylon filaments with the liquid, which has a slight plasticizing effect on the polymer.

The following examples show operation with other synthetic organic polymers.

*Example 11*

A sample of undrawn poly(meta-phenylene isophthalamide) is drawn by the process of the present invention in a bath at 20° C. containing 39% by weight of ethanol, 59% by weight of formic acid, and 2% by weight of methylene blue dye C.I. 52,015. Undrawn filaments are run through the dye bath and cracked and drawn. During the drawing the filaments imbibe the dye to give a good depth of blue color. The yarn is then heat-set by running it over a hot pin at 120° C. to give filaments with a boil-off shrinkage of only 4%. The ethanol is the cracking agent. The formic acid is added to cause crystallization of the polymer.

*Example 12*

Filaments of linear crystalline polypropylene are stressed in a bath of acetone at −20° C. Examination of the fibers shows transverse cracks necessary to this invention. Cracking does not occur at temperatures above 10° C.

When the polypropylene filaments are drawn in a bath containing 2% of the dye of Example 11 a deep blue color is obtained. Polypropylene is not dyed or at best merely stained to extremely light shades by this dye when drawn by conventional means.

*Example 13*

Filaments of a polyurethane from ethylene bis-chloroformate and piperazine are spun and then cold-drawn to 1.5× their original length in a cracking bath at 20° C. consisting of a mixture of lauryl alcohol esters of phosphoric acid. The bath contains 5% of a basic red dye, C.I. Basic Red 14. Good penetration of the dyestuff is observed. Other equivalent cracking baths include lauryl alcohol, decyl alcohol and kerosene.

The preceding examples have given some indication of the applicability of the principles of the present invention to a number of specific embodiments. However, it should not be considered that the examples in any way define all the limitations of the present invention. In fact, the present invention is applicable to a very wide number of specific processes and gives a large number of superior new products. For example, a large number of different additives can be employed. The following illustrates the range of materials which have successfully been added to synthetic organic polymer filaments according to the present invention.

Polymers which are incompatible with the polymer making up the filament can be imbibed into the filamentary structure. Lubricants such as silicone oils, Syl Chem 21, poly(2-ethoxy acrylate) and poly(ethyl acrylate) can be infused to give a permanent low-friction surface. Flame-proofing agents, flame retardants, and the like such as bis(chloroethyl) vinyl phosphate and phytic acid can be infused. Cross-linking agents which cannot be added to the polymer before or during melt spinning (because they would cross-link during spinning) can, however, by the process of the present invention be added by this low-temperature drawing technique, and then the cross-linking agents can be activated later. Inorganic salts, such as silver nitrate, potassium bichromate, and the like can be employed. Wetting agents as well as hydrophobic agents can be imbibed. Antisoilant additives are highly useful for some synthetic fibers. Adhesives and bonding agents can be infused to provide fibers and films with greater adhesion to rubber, to other polymers, and to surface-modifying chemicals. In addition, it is possible to infuse into the filamentary structure several substances at the same time, for example, mixtures of two totally different types of dyes of like or different colors as well as three colors of the same type. Thus, one can add a dyestuff, an anti-static agent, and a dye stabilizer or ultraviolet absorber simultaneously and economically in a single process step. In another modification, the imbibing process can be used to achieve step-wise imbibition of two, three or more different modifiers, one or more at each step, as already shown.

Most of the above-mentioned additives are in themselves non-reactive. However, a large number of reactive materials can be added to the polymer by the process of the present invention and subsequently or simultaneously reacted with another material.

It has been found possible to perform the following chemical reactions within a fiber structure by imbibing one or more of the reactants simultaneously or successively: In polyanhydride reactions with formaldehyde, reaction of amide groups with monoisocyanates, chlorination employing $SO_2Cl_2$ with a catalyst, sulfonation, chlorosulfonation, oxidation, thiocyanation, and reactions of an imbibed additive with the basic polymer structure such as methoxymethylation, reaction of a polyamide with methylol acrylamide and reduction of amide groups in the chain to secondary amine groups.

Chemical modification can also be employed following the imbibition of a cross-linking agent as, for example, with diisocyanates, or phosgene, the introduction of methylborate followed by hydrolysis and heat linking, the introduction of pentaerythritol, glycerol and the like followed by ester interchange and similar cross-linking cations.

Additional reactions which can be caused to take place within the fiber include the introduction of an organic salt such as hexamethylene diammonium adipate followed by thermal polymerization within the fiber, deposition of low molecular weight, macrointermediates for long-chain polymers or monomers such as isobutylene butadiene, cross-linking polymers such as divinylbenzene, glycol dimethacrylate or other vinyl monomers.

All of the above modifications of the present invention are applicable not only to films and fibers but to articles of larger dimensions whenever the flow involved during the molding or shaping process is sufficiently great to permit crack formation according to the principles already described. It is also possible to employ the principles of the present invention to obtain gross products derived from filamentary structures, taking advantage of the modifying additives which can be added. For example, filaments of polyethylene terephthalate can be infused with a cross-linking agent such as divinyl benzene, ethylene diacylate, acylamide plus formaldehyde, boric acid, citric acid, glycerol and the like during the drawing process of the present invention. These fibers, without activation of the cross-linking material, can be cut into staple lengths and formed into non-woven batts or fabrics. After the non-woven fabric has been formed, the cross-linking agent can be activated by known procedures to give a highly stable structure which is bonded in a much more intimate manner than is normally achievable.

The present invention can also be employed to give a filamentary threadline of varying appearance. For example, an undrawn filament containing a pigment or other agent introduced by either melt-dyeing or solution-dyeing can be drawn by the process of the present invention to introduce a second overdyeing material, coloring agent or other additive.

Since many different embodiments of the invention may be made without departing from the spirit and scope thereof, it is to be understood that the invention is not limited by the specific illustrations except to the extent defined in the following claims.

I claim:

1. In the production of oriented shaped articles by cold drawing filaments and films of synthetic linear organic polymers and applying modifying agents to enhance the appearance and properties, the method of improving penetration of the modifying agent into the polymer which comprises cold drawing the shaped article while the polymer is simultaneously in contact (1) with a cracking agent at −30° to 40° C. to form surface cracks resulting in multiple neck drawing and (2) with the modifying agent to cause the modifying agent to infuse into said cracks and be entrapped within the polymer, said modifying agent being soluble in the cracking agent.

2. In the process of coloring filaments of synthetic linear organic polymer, the method of improving penetration of coloring agent into the filaments which comprises applying the coloring agent in solution in a cracking agent for the polymer while multiple neck drawing the filaments at −30° to 40° C. in contact with the cracking agent containing the coloring agent to form surface cracks through which the coloring agent infuses into the polymer and becomes entrapped.

3. A process as defined in claim 2 wherein said surface cracks form transversely to the filament axis at a frequency of at least 10 per inch of filament and the concentration of infused coloring agent is greatest in the vicinity of said cracks to provide detectable variations in color intensity.

4. A process as defined in claim 3 wherein said surface cracks have a frequency of 500 to 20,000 per inch to provide a uniform appearance to the unaided eye.

5. The method of improving penetration of a modifying agent into filaments of polyethylene terephthalate which comprises multiple neck drawing the filaments at 10° to 30° C. while simultaneously in contact with alcohol to form surface cracks and with modifying agent to infuse into the filaments through the cracks, the alcohols containing the modifying agent in solution.

6. The method of improving penetration of a modifying agent into filaments of nylon which comprises multiple neck drawing the filaments at 10° to 30° C. while simultaneously in contact with acetone to form surface cracks and with modifying agent to infuse into the filaments through the cracks, the acetone containing the modifying agent in solution.

7. The method of improving penetration of a modifying agent into filaments of polypropylene which comprises multiple neck drawing the filaments at −30° to 10° C. while simultaneously in contact with acetone to form surface cracks and with modifying agent to infuse into the filaments through the cracks, the acetone containing the modifying agent in solution.

8. The method of improving penetration of a modifying agent into filaments of polyurethane which comprises multiple neck drawing the filaments at 10° to 30° C. while simultaneously in contact with lauryl phosphates to form surface cracks and with modifying agent to infuse into the filaments through the cracks, the lauryl phosphates containing the modifying agent in solution.

References Cited by the Examiner

UNITED STATES PATENTS

| | | | |
|---|---|---|---|
| 2,278,888 | 4/1942 | Lewis | 28—80 XR |
| 2,289,232 | 7/1942 | Babcock | 28—82 |
| 2,294,957 | 9/1942 | Caldwell | 18—47 |
| 2,302,077 | 11/1942 | Van Kohorn | 28—81 |
| 2,612,679 | 10/1952 | Ladisch | 28—82 |
| 2,674,025 | 4/1954 | Ladisch | 28—82 |
| 2,715,363 | 8/1955 | Hoover | 101—426 |
| 2,736,946 | 3/1956 | Stanton et al. | 28—82 |
| 3,011,215 | 12/1961 | Alley | 18—47 |

OTHER REFERENCES

Moncrieff, R. W., Artificial Fibres, London, National Trade Press, Ltd., 1950, pages 61–62.

Vol. 46, No. 9, "Journal of the Textile Institute," September 1955, published in England, pages T629–T631.

Billmeyer, Textbook of Polymer Chemistry, published in 1957 by Interscience Publishers, New York, and London, pages 423–424 relied on.

ALEXANDER H. BRODMERKEL, *Primary Examiner.*

WILLIAM STEPHENSON, MORRIS LIEBMAN,
*Examiners.*